(No Model.)

P. HOOGERZEIL.
STEAM OR BAKING PAN.

No. 512,615. Patented Jan. 9, 1894.

Witnesses
Lauritz N. Möller.
Kittie M. Hanson.

Inventor
Peter Hoogerzeil
by Alvan Andrie his atty.

UNITED STATES PATENT OFFICE.

PETER HOOGERZEIL, OF BEVERLY, MASSACHUSETTS.

STEAM OR BAKING PAN.

SPECIFICATION forming part of Letters Patent No. 512,615, dated January 9, 1894.

Application filed September 11, 1893. Serial No. 485,226. (No model.)

*To all whom it may concern:*

Be it known that I, PETER HOOGERZEIL, a citizen of the United States, and a resident of Beverly, in the county of Essex and State of Massachusetts, have invented new and useful Improvements in Steam or Baking Pans, of which the following, taken in connection with the accompanying drawings, is a specification.

This invention relates to improvements in steam or baking pans for the purpose of roasting, baking or cooking meats, vegetables or food of any kind and it is carried out as follows, reference being had to the accompanying drawings wherein—

Figure 1:
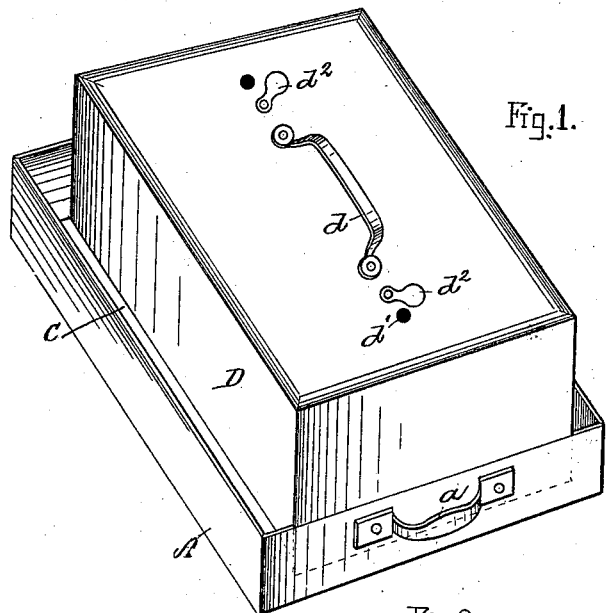
Figure 2:
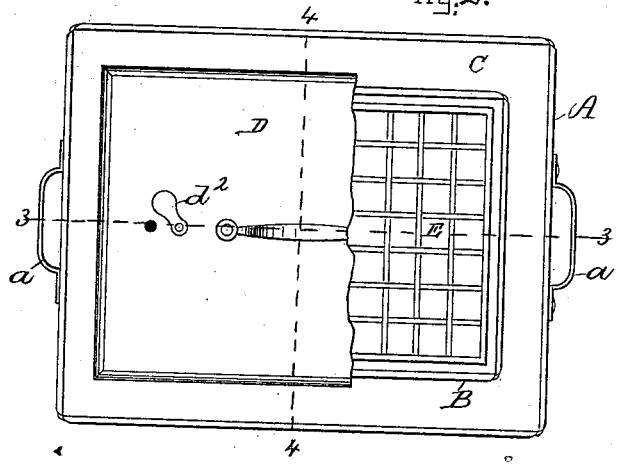
Figures 3, 4:
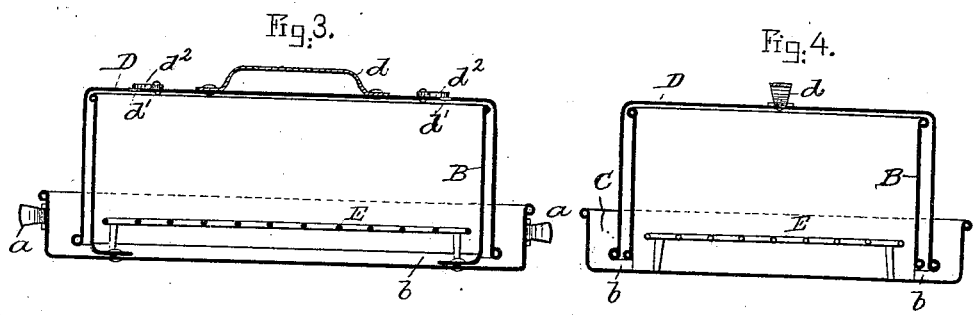

Figure 1 represents a perspective view of the invention. Fig. 2 represents a plan view thereof showing a portion of the cover as removed. Fig. 3 represents a longitudinal section on the line 3—3 shown in Fig. 2; and Fig. 4 represents a cross section on the line 4—4 shown in Fig. 2.

Similar letters refer to similar parts wherever they occur on the different parts of the drawings.

The invention consists in combination with a baking pan A of any suitable size, depth or shape of an internal food receptacle B arranged inside of said pan and secured to the bottom thereof with an annular space C left between the interior wall of said pan and the exterior portion of the receptacle B as shown in Figs. 2, 3 and 4. At the bottom of the food receptacle B is left one or more openings $b$, by which communication is established between the main pan A and the food receptacle B as shown.

D is an inverted removable cup shaped cover adapted to fit loosely outside of the food receptacle B and into the space C as shown in the drawings.

$a$, $a$ are handles as usual on the main pan A; and $d$ is a handle on the cover D by means of which it may be lifted and moved.

In practice I prefer to use in connection with the invention a removable rack E adapted to rest on the bottom of the pan A within the food inclosure B as shown in the drawings. In cooking, baking or roasting the food it is placed in the inclosure B either direct on the bottom of the outer main pan A or upon the rack E as may be required and a certain amount of water or other liquid placed in the pan A as is usual in cooking or roasting food. The cover D is then put in place as shown in the drawings, its lower edge being sealed in the liquid contents of the main pan A as shown in Figs. 3 and 4. Through the lower openings $b$, $b$ in the wall of the receptacle B, the liquid contents of the main pan A is permitted to flow freely into and out of the inner food receptacle B during the cooking operation. For the purpose of preventing the cover D from rising upward by the accumulation of steam pressure below the same, I prefer to provide the top of the said cover with one or more perforations or valve openings $d'$, $d'$, adapted to be closed more or less as occasions may require by means of suitable valves, cut-offs or gates $d^2$, $d^2$, as shown in the drawings. I have shown such valves as pivoted to one side of the orifices but this is not essential as any suitable valves or cut-offs well known in the art may be used with this my device without departing from the spirit of my invention.

By this invention the food will be rapidly cooked, baked or roasted in a thorough and even manner without any liability of burning or imperfect treatment. The constant basting and examination is avoided on account of the non-evaporation, or nearly so, of the liquid in the pan. The cooking, roasting or baking of food is accomplished in a quicker manner and with less attention and superintendence of the person in charge as compared with the use of the ordinary open baking pans.

Another great advantage with my invention is that water or liquid may be poured into the pan A at any time without removing the cover D and the height of the liquid in said pan can at any time be ascertained from the outside without removing said cover.

Having thus fully described the nature, construction and operation of my invention, I wish to secure by Letters Patent and claim—

The herein described cooking utensil, consisting of a main pan A, having an internal food receptacle B permanently connected therewith and provided with openings between its lower edge and the bottom of the main pan, in combination with an inverted cup shaped cover D fitting over the food receptacle B within the walls of the main pan, substantially as and for the purpose set forth.

In testimony whereof I have signed my name to this specification, in the presence of two subscribing witnesses, on this 2d day of September, A. D. 1893.

PETER HOOGERZEIL.

Witnesses:
 ALBAN ANDRÉN,
 HELEN S. ANDRÉN.